United States Patent [19]

Strand

[11] Patent Number: 5,480,566
[45] Date of Patent: Jan. 2, 1996

[54] METHOD FOR RELEASING AND SEPARATING OIL FROM OIL SANDS

[75] Inventor: William L. Strand, Edmonton, Canada

[73] Assignee: Bitmin Corporation, Toronto, Canada

[21] Appl. No.: 66,044

[22] PCT Filed: Nov. 27, 1991

[86] PCT No.: PCT/CA91/00415

§ 371 Date: Nov. 22, 1993

§ 102(e) Date: Nov. 22, 1993

[87] PCT Pub. No.: WO92/09672

PCT Pub. Date: Jun. 11, 1992

[30] Foreign Application Priority Data

Nov. 27, 1990 [CA] Canada ......................... 2030934

[51] Int. Cl.⁶ ......................................... C10G 1/04
[52] U.S. Cl. .......................... 210/772; 210/787; 208/390; 208/391; 196/14.52
[58] Field of Search ................... 196/14.52; 208/390, 208/391; 210/772, 787, 512.1

[56] References Cited

U.S. PATENT DOCUMENTS

| | | | |
|---|---|---|---|
| 889,169 | 5/1908 | Trump | 210/403 |
| 4,098,648 | 7/1978 | Kraemer et al. | 196/14.52 |
| 4,512,956 | 4/1985 | Robinson et al. | 208/391 |
| 4,533,459 | 8/1985 | Dente et al. | 208/391 |
| 4,946,597 | 8/1990 | Sury | 210/705 |
| 4,952,315 | 8/1990 | Saab | 210/772 |

FOREIGN PATENT DOCUMENTS 1085761  9/1980  Canada.
360977   2/1921  Germany.
2611251  10/1976 Germany.
3815309  11/1988 Germany.

Primary Examiner—Robert A. Dawson
Assistant Examiner—David Reifsnyder
Attorney, Agent, or Firm—Ridout & Maybee

[57] ABSTRACT

An oil sands separator includes a drum (10) having a solids discharge end (24) and a liquid discharge end (22) and a spiral ribbon (14) having a plurality of flights wound inside the interior of the drum. A first plate (28) partially closes the solids discharge end and has a first opening (32) disposed within it. A second plate (26) partially closes the liquid discharge end and has a second opening (30) disposed within it. A conveyor (46) is provided at the liquid discharge end for conveying feed into the drum through the second opening and into the spiral ribbon. A pipe (50) at the solids discharge end conveys hot water into the drum through the first opening. Pockets (40) at the solids discharge end remove solids from the drum as a drive rotates the drum and its spiral ribbon. A process of releasing and separating oil from oil sand involves the steps of conveying oil sand to a feed end of a hot water bath, providing hot water to a solids discharge end, opposed to the feed end, of the separator in an amount sufficient to cover the oil sand in the separator, flowing the hot water to the feed end of the separator, moving the oil sand to the solids discharge end of the separator while gently rolling the oil sand in the hot water to release oil from the sand and allow it to separate into the hot water, removing solids from the solids discharge end of the separator; and removing the hot water and oil from the feed end of the separator.

3 Claims, 2 Drawing Sheets

METHOD FOR RELEASING AND SEPARATING OIL FROM OIL SANDS

FIELD OF THE INVENTION

This invention relates to an oil sands separator and a method of separating oil from oil sands.

BACKGROUND OF THE INVENTION

By "oil sands" are meant mineable oil sands of the morphology found in the Athabasca deposits in Northern Alberta, and deposits elsewhere in the world having similar characteristics. To the extent that it may be possible to condition oil and sand combinations found elsewhere, naturally or as a result of oil spills, to have generally similar morphology, the invention is also applicable to such combinations. This morphology and some of its implications from the point of view of separating the bitumen content of the sand are discussed in a paper "Athabasca Mineable Oil Sands: The RTR/Gulf Extraction Process—Theoretical Model of Detachment", A Corti and M. Dente, Paper No. 81, Fourth UNITAR/UNDP Conference on Heavy crude and Tar Sands. A process and apparatus for practically implementing the theory set forth in this paper are described in Canadian Patents Nos. 1,165,712 of RTR Riotinto Til Holding S.A. and 1,167,238 of Ingeco International S.A., discussed further below. For the purposes of the present specification, the entities referred to variously as lumps, particles and matrices in the published art are referred to as granules, to distinguish them on the one hand from sand grains or particles which they contain, and on the other hand from large lumps of oil sand as mined. Such granules consist of a nucleus of sand grains covered with a film of connate water, which may itself contain fine particles, encapsulated, often with gas inclusions, within a layer of the heavy oil known as bitumen, which is essentially solid at ground temperatures. The terms oil and bitumen are used interchangeably in this specification.

The originally developed process for releasing bitumen from tar sands was the Clark hot water process, based on the work of Dr. K. A. Clark, and discussed in the above paper. The Clark process has disadvantages, some of which are discussed in the introductory passage of U.S. Pat. No. 4,946,597, notably a requirement for a large net input of thermal and mechanical energy, complex procedures for separating the released oil, and the generation of large quantities of sludge requiring indefinite storage.

Both the presently used commercial method and apparatus for the separation of oil or bitumen from oil sands based on the Clark process, and the similar process and apparatus described in U.S. Pat. No. 4,946,597, use vigorous mechanical agitation of the oil sands with water and caustic alkali to disrupt the granules and form a slurry, after which the slurry is passed to a separation tank for the flotation of the bitumen from which the bitumen is skimmed. As proposed in the U.S. patent, the process may be operated at ambient temperatures, with a conditioning agent being added to the slurry. Earlier methods, such as the Clark process, used temperatures of 85° C. and above together with vigorous mechanical agitation, and are highly energy inefficient.

It is characteristic of both of the above processes that a great deal of mechanical energy is expended on physically disintegrating the oil sands structure and placing the resulting material in fluid suspension, this disintegration being followed by physical separation of the constituents of the suspension. Chemical adjuvants, particularly alkalis, are utilized to assist these processes. The separation process particularly is quite complex, as will be readily apparent from a study of U.S. Pat. No. 4,946,597, and certain phases have presented particularly intractable problems. Oil sands typically contain substantial but variable quantities of clay, and the very fine particles constituting this clay are dispersed during the process, limiting the degree to which the water utilized in the process can be recovered by flocculation of the clay particles. No economical means has been discovered of disposing of the flocculated and thickened clay particles, which form a sludge which must be stored in sludge ponds where it remains in a gel-like state indefinitely.

The Corti and Dente paper mentioned above suggests that better results should be obtained with a proper balance of mechanical action and heat application, and Canadian Patent No. 1,165,712 (the '712 patent) points out that more moderate mechanical action will reduce disaggregation of the clay content of the sands. Nevertheless, it continues to regard external mechanical action as playing an essential role in the disintegration of the oil and granules, which will inevitably result in partial dispersion of the clay.

Thus it proposes to use relatively more gentle agitation of the sand in a slowly rotating digester described in Canadian Patent No. 1,167,238 (the '238 patent). The digester in the '238 patent comprises in its broadest embodiment a shell, means for entry of liquids and solids into the shell at one end of the shell, a tubular outlet at the other end of the shell for discharge of liquids, a solids outlet at the same end as said liquids outlet, surrounding but separated from the liquids outlet, and a screw which surrounds the tubular liquids outlet to urge solids to and through the solids outlet, which screw is secured at its outer periphery to the shell. As seen in FIGS. 1, 2, 3 and 4 of the '238 patent, the operating embodiment of the digester includes numerous plates and bars secured to the shell for moving the solids along the shell, and a set of bars for separating the clay from the oil sands. Slurry is introduced at one end of the shell. This slurry is a mixture of oil sands and hot water. The slurry is moved by the plates, bars and screw down the shell during which it is agitated and the oil and water gradually separate from the solids. At the other end of the shell, such oil and water, together with some fine material that has separated from the solids, is removed from one central, axial outlet, while the solids exit the digester at its base.

This process, which is a cocurrent process, still requires considerable post digestion treatment, as described in the '712 patent. The post digestion steps include further separation of the liquids into an oil rich component and a middlings component consisting primarily of water and fines, removing the fines from the middlings component by flocculation and centrifuging, and further treating the oil rich component for the removal of contained water, fines and solids. A detailed outline of the process is described with reference to FIG. 1 of the '712 patent.

SUMMARY OF THE INVENTION

The present inventor has appreciated, and experimentally verified, that oil sand granules exposed to hot water at a temperature, typically above 50°, sufficient to soften the bitumen will essentially spontaneously undergo liberation of the sand grains from within the granules as its bitumen coating ruptures and agglomerates into droplets. The water then permits separation of the sand grains from the bitumen droplets. Whilst bitumen has a specific gravity which is very slightly greater than that of water, the gas inclusions that occur in the bitumen and any air bubbles in the water tend to adhere to the bitumen droplets, which in turn tend to adhere to one another, reducing the effective specific gravity of the bitumen to a degree which permits it to float as a "froth". He therefore seeks to permit sufficient contact time between the granules and the hot water to occur to permit the above two stages of sand grain liberation or release, and separation of the bitumen, to occur, whilst applying only such mechanical agitation to the material being treated as is necessary to ensure adequate exposure of the granules to hot water to provide thermal transfer and opportunity for the liberated sand and bitumen to separate.

Rather than seeking to find a balance of thermal and mechanical action to release the oil from the sand, the present invention seeks to rely essentially on thermal action alone to provide release or liberation of the oil, and the presence of hot water as a medium both for heat transfer and for separation to occur, mechanical action being used merely to ensure adequate contact between the water and the oil sand and its separated constituents so as to permit it to act effectively as both a heat transfer medium and a separation medium.

Accordingly the invention provides a method of liberating and separating oil from oil sand, comprising submerging sand to be treated into a bath of hot water, gently rolling the sand within the bath, resultant agitation of the water being in sufficient to prevent liberated oil droplets from migrating to the surface of the bath, and the rolling of the sand being insufficiently aggressive to cause substantial dispersion of any clay present, but sufficiently prolonged to permit substantial release and separation of oil coating from granules of the sand, removing sand from one end of the bath, and removing water and oil from the other end of the bath, sand and hot water being supplied at opposite ends of the bath to those at which they are removed.

By passing the oil sand to be treated and the hot water in opposite directions through the bath, various advantages accrue. Firstly, separated oil froth passes with the water towards the opposite end of the bath from that at which the separated sand is removed, thus minimizing the risk of reentrainment of oil on the sand as the latter is removed. The sand is exposed to the hottest water in the later stages of its treatment, thus favouring completion of liberation of the oil and the separation process. A settling zone may be provided at the end of the bath from which the oil is removed, thus again favouring separation of the suspended solid particles from the water and oil before the latter leaves the bath.

It is an important objective of the invention to minimize the attrition of clay lumps in the oil sands with resultant suspension of clay solids in the treatment water. This is achieved by minimizing mechanical working of the oil sands during the release and separation process. The less clay is suspended, the easier is the treatment and recycling of the water used in the process, and the less clay sludge is produced requiring indefinite storage. An objective is to leave most of the clay essentially in its original state so that it may be returned, together with the separated sand, to the site from which the raw oil sands were extracted.

While countercurrent methods have been proposed for mineral extraction with solvents such as in the U.S. Pat. No. 4,098,648 to Kraemer et al and U.S. Pat. No. 889,159 to Trump, the technique has not previously been proposed for the release and separation of oil from oil sands. The mineral or oil extraction process using solvents, while using a countercurrent flow of solvent, works in a different way to the present invention because there the solvent is percolated through the feed. Hence the shells used in those devices, while having apparent similarity to the present invention, are typically perforated or have perforated spiral ribbons to allow the percolation of the solvent. In the present invention, the water is deeper than the feed solids and thus released bitumen floats to the top of the water and is moved towards the discharge end of the drum. The solvent extraction process has not to the knowledge of the inventor previously been considered applicable to oil sands treatment with water.

Apparatus is also known for the heavy medium separation of minerals, in which a finely crushed ore to be separated is blended with a medium intermediate in specific gravity between fractions to be separated, so that one fraction floats and the other sinks. The medium is usually a pseudo-fluid in the form of a suspension of finely ground and easily separated mineral of suitable specific gravity such as magnetite. Such a process is purely a separation process. The fractions to be separated have already been released from one another by crushing or grinding.

The invention also extends to apparatus for releasing and separating oil and solids from oil sand comprising: a drum having a solids discharge end and a liquid discharge end; means for advancing solids towards said solids discharge end with a rolling action including a spiral ribbon having a plurality of flights wound inside the interior of the drum, the spiral ribbon extending from the solids discharge end to adjacent the liquid discharge end; a first plate partially closing the solids discharge end and having a first opening disposed within it; a second plate partially closing the liquid discharge end and having a second opening disposed within it; means at the liquid discharge end for conveying oil sand into the drum through the second opening and into at least one flight of the spiral ribbon; means at the solids discharge end for conveying hot water into the drum through the first opening; means at the solids discharge end for removing solids from the drum; means at the liquid discharge end for discharging water and oil floating on the water; and drive means for rotating the spiral ribbon.

In a preferred embodiment, the spiral ribbon is attached to the inside of the drum and the spiral ribbon rotates with the drum.

Also in a preferred embodiment, the apparatus includes a settling zone at the liquids discharge end of the drum to promote setting of solids and floating of oil froth.

Preferably the counter current flow is established by having the second opening lower than the first opening.

The means at the solids discharge end for removing solids from the drum preferably includes a plurality of pockets circumferentially disposed about the drum and a receiver for receiving solids from the pockets.

BRIEF DESCRIPTION OF THE DRAWINGS

There will now be described a preferred embodiment of the invention with reference to the accompanying drawings by way of example in which like elements are identified by like numerals and in which.

DESCRIPTION OF THE PREFERRED EMBODIMENT OF THE INVENTION

Figure 1:
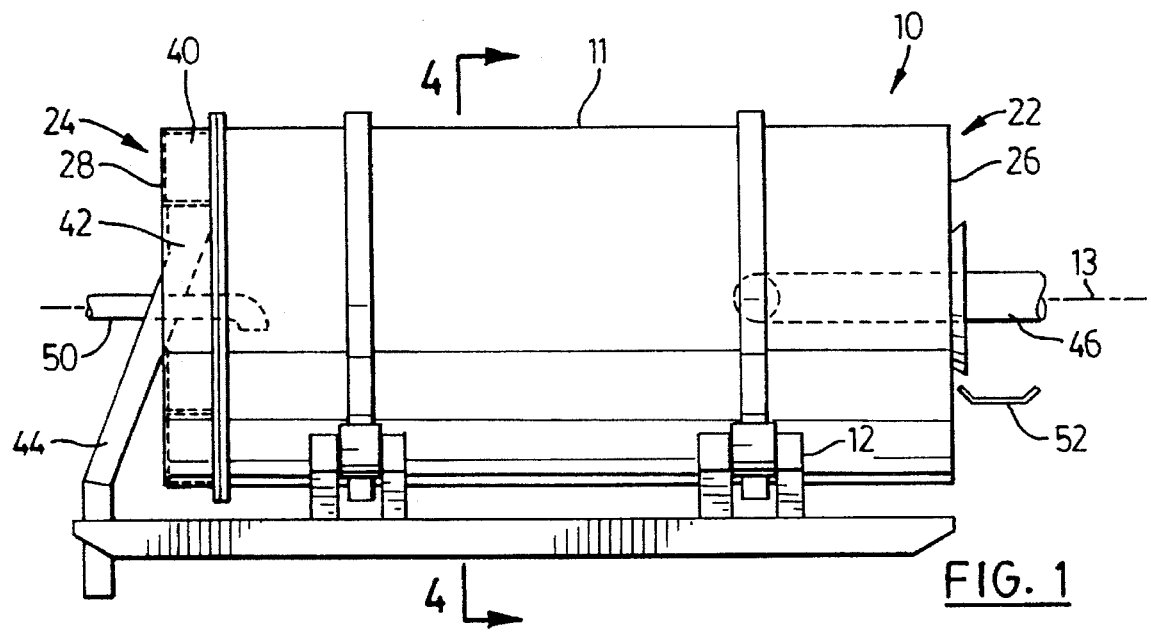
FIG. 1 is a side elevation of a separator according to the invention.

The apparatus of the invention for releasing and separating oil from oil sands is constituted in the preferred embodiment by a rotary drum 10 having a shell 11, mounted on rollers 12 for rotation about a horizontal axis 13 and driven by rotation of the rollers 12 or of a girth gear (not shown) by any of various drive means, not shown but well known in the art.

Secured to the internal wall of the shell 11, in the central portion of the drum 10, there is a spiral ribbon 14. This is a preferred arrangement of the spiral ribbon 14 within the drum 10. The separator could use a rotating ribbon 14 within a curved trough in which the spiral ribbon rotates but not the trough, but such an arrangement would require the spiral ribbon to be mounted on bearings, and the bearings would need to be sealed. In such a case, the drive means would be independent of the drum, but in the preferred embodiment the drive means for the spiral ribbon includes the drum.

The spiral ribbon 14 has several flights forming compartments 16. Pulp mixers 20, which consist of flat blades, are attached to the shell 11 and the spiral ribbon 14 in sufficient numbers to ensure such engagement between the drum and flights and the sand as will produce a rolling action of sand in the water as the drum rotates. By a rolling action is meant a gentle circulating movement of the sand within the rotating drum relative to the water therein.

The ends 22 and 24 of the drum 10 are partially closed by circular plates 26 and 28 respectively secured to the circular edges of the cylindrical shell 11. The feed end 22 is partially closed by the plate 26 which has a large opening 30 centrally and axially disposed within it. The solid discharge end 24 is partially closed by plate 28 which has a smaller opening 32 centrally and axially disposed within it. Whilst the axis of the drum could be tilted to produce an effect similar to that of the different sized openings, and such a tilt could be utilized as a means to beach the sand out of the water for removal, a horizontal drum will provide the largest throughput of oil sand for treatment lot given dimensions of the drum and is preferred.

Figure 2:
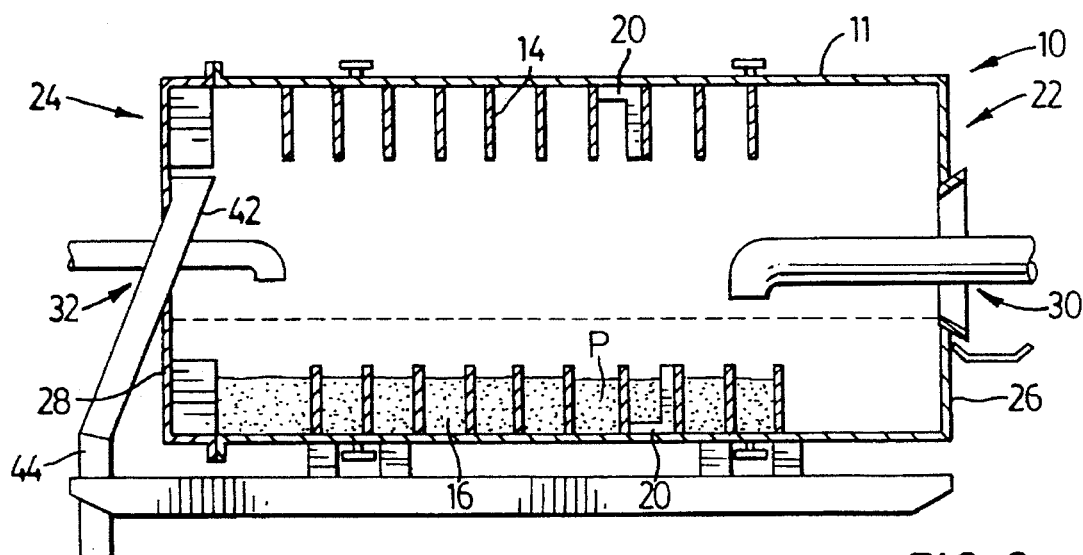
FIG. 2 is a longitudinal section of the separator of FIG. 1.
Figure 3:
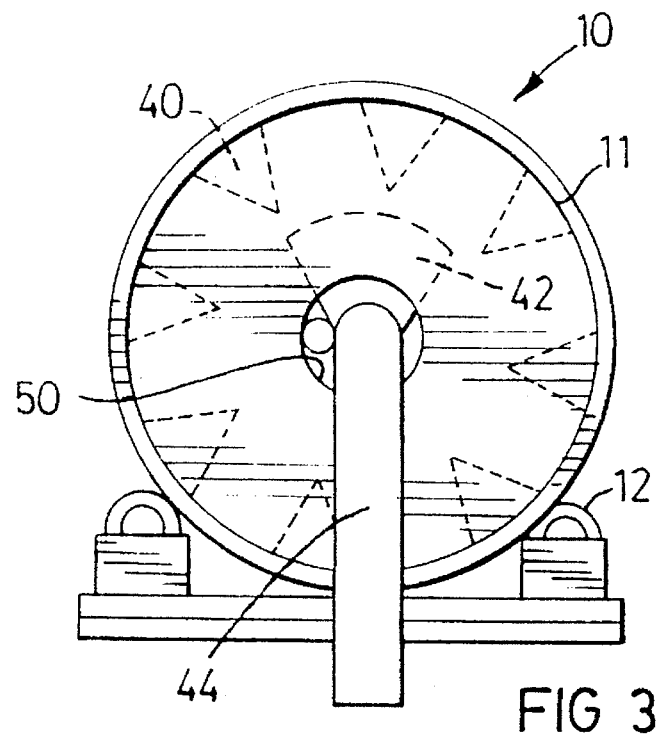
FIG. 3 is an end elevation of the separator of FIG. 1.
Figure 4:
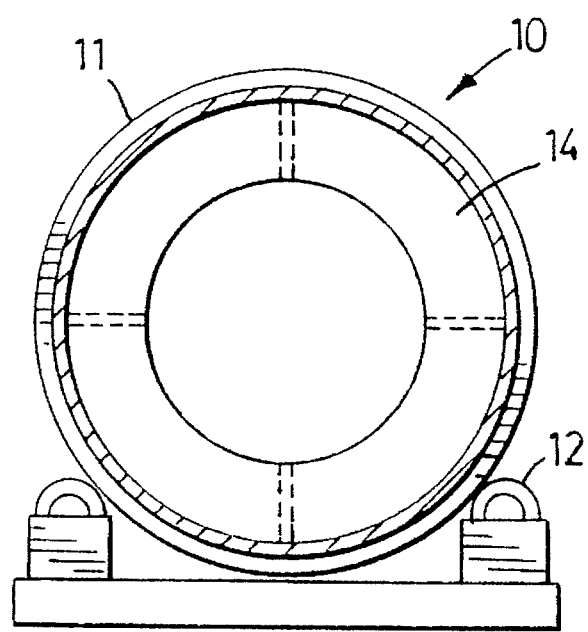
FIG. 4 is a centre cross-section of the separator of FIG. 1.

The liquid level in the drum 10 (shown as a dashed line in FIG. 2) is established by the size of the feed end circular opening 30. It is important that this level be higher than the level of both the solids and the spiral flights. The direction of flow, which must be countercurrent, is determined by the respective levels of the openings 30 and 32. In this embodiment, where the plates 26 and 28 rotate with the drum 10, and the openings 30 and 32 are centrally disposed within their respective plates, the opening 30 must be larger than the opening 32 to establish the flow from the sand or solids discharge end 24 to the liquid discharge end 22.

A settling zone 34 is provided between the spiral ribbon 14 and the feed end plate 26. This zone allows fine materials that are suspended in the liquids to settle out of the liquid or float to its surface in the relatively calm environment created by the absence of mixers and the spiral ribbon. The settling zone is preferred to have a dimension of 0.1–0.2 sq. cm. per kilogram per hour. The dimension is defined by the area of the surface of the water in the settling zone.

At the solid discharge end 24 there is a series of sand lifting and draining pockets 40 circumferentially attached to the inside of the shell 11. The pockets 40 rotate with the shell 11, lifting solids at the solids discharge end 24, and dump the solids into the solids receiver 42. The solids receiver 42 is attached to the discharge chute 44. The chute 44 and receiver 42 are externally supported by a structure (not shown). The pockets 40, receiver 42 and discharge chute 44 together form one means for removing solids from the drum 10.

Oil sand is fed to the drum 10 by feeder 46 which can be a belt conveyer, screw conveyor, or other suitable means for conveying feed into the drum 10. The feeder 46 extends into the drum 10 at least far enough that the oil sand can be guided within the first flight of the spiral ribbon 14. Hot water is admitted from a hot water source (not shown) through means for conveying hot water to the drum 10 such as pipe 50 to the solid discharge end 24 of the drum 10 and flows from there to the feed end 22, where it exits the drum 10 at the lower level of opening 30. This direction of flow is counter to the direction of movement of material held in the spiral ribbon 14. It may be helpful to discharge the water from the pipe 50 as a spray or some other directed manner such as to repel any floating bitumen tending to approach the solids discharge end of the drum.

OPERATION OF THE INVENTION

Operation of the invention may be described in its preferred embodiment as follows. Oil sand is continuously fed into the drum 10 by feeder 46 and directed into the space between the flights of the spiral ribbon 14 at the feed end of the drum. The oil sand may be in as-mined condition, subject only to such crushing as will avoid the presence of lumps large enough to jam between flights of the ribbon 14 or other structures associated with the drum. The oil sand forms a pulp P in the compartments 16 by mixing with the hot water flowing counter currently from the water inlet 50 at the other end of the drum 10. The rotation of the drum 10 is such that the spiral ribbon 14 slowly propels the pulp from the feed end forward to the solids discharge end of the drum 10. Hot water is fed into the solids discharge end through the pipe 50 in an amount and to a depth sufficient to cover both the solid material being moved by the spiral ribbon and the spiral ribbon itself. The hot water flows over the solids in the spiral ribbon and part of it mixes with the solids as the latter are rolled by the mixers. As the drum 10 rotates the pulp mixers 20 roll the pulp in the compartments 16 and cause contact of the pulp with the counter flowing hot water. The contact with hot water causes softening of the bitumen, followed by rupture of the bitumen coating of the oil sand granules, expulsion of the sand particles, and formation of oil droplets. The released sand sinks, whilst the oil droplets and any gas within the granules tend to agglomerate and float as a bitumen froth. The released bitumen froth floats with the counter flowing water to the settling zone 34. In the settling zone 34 fine minerals which may have entered the water have an opportunity to settle to the bottom of the drum 10 and flow to the spiral ribbon 14 whence they are transported to the solids discharge end of the drum 10.

Water carrying the bitumen froth flows from the feed end circular opening 30 into a collecting launder 52 (not shown) for further separation and processing. Initial tests have indicated that the use of caustic soda to assist release of the bitumen should not normally be necessary, and the absence of this chemical assists subsequent processing and reduces dispersion of clays.

The rotation of drum 10 is very slow, typically to achieve a drum peripheral velocity of about 5 feet per minute. The peripheral velocity required depends upon the oil sand being treated and the mechanical action required to release sand particles from the bitumen while limiting disaggregation of the clay lumps. Thus the mechanical action on clay lumps contained in the oil sand is very gentle and the clay lumps will pass through the drum 10 with limited disaggregation. The speed of rotation, and the configuration of the mixers, should be designed to minimize suspension of clay solids, whilst achieving a sufficient residence time for the oil sand in the drum for a high degree of release and separation of the oil or bitumen from the sand to take place.

By the time the sand reaches the solid discharge end of the drum 10 most of the bitumen will have been released and have floated away towards the liquid discharge end.

The remaining sand, clay lumps, and tramp rocks then reach the lifting pockets 40. The rotation of the drum 10 lifts and drains water from the sand, lumps, and rocks contained in the lifting pockets 40. When the lifting pockets 40 reach a sufficient elevation the remaining damp material falls into the receiver 42 and slides out the solid discharge chute 44.

The ratio of length to diameter of the drum 10 may be between about 1.5 to 1.0 and 10.0 to 1.0 but preferred is about 2.0 to 1.0 and 3.0 to 1.0.

The diameter of the feed end opening 30 is preferably about 90% of the inner diameter of the spiral ribbon 14. As noted above, where a circular opening 30 is used (as is required in the case of a rotating drum), having the diameter of the opening 30 smaller than the diameter of the spiral ribbon 14 ensures the countercurrent flow of the water if the drum axis is horizontal.

The diameter of the solid discharge opening 32 is as small as practicable while allowing room for the discharge chute 44 and the water pipe 50.

The spiral ribbon will typically have between about 3 and 20 flights (turns). About 10 flights is believed to be preferable.

The rate of rotation can be such that the peripheral velocity of the drum is between 0.6 and 15 meters per minute. The relationship between the drum peripheral velocity and spiral configuration will be such as to provide a residence time for the pulp in the spiral zone of about 10 minutes, which initial tests have indicated is a sufficient time for satisfactory release and separation of the bitumen using water temperatures as discussed below. Some increase or decrease of this time may be desirable to suit particular installations or grade of oil sand. The number of pulp mixers 10 can be between one and eight per flight.

The size and number of the lifting pockets 40 should be selected to properly dispose of the expected amount of sand produced at the solids discharge end.

The maximum lump size of the oil sand should not exceed the space between the spiral flights 14, the size of the lifting pockets 40, or the size of the discharge chute 44.

The maximum feed rate cannot exceed the volumetric capacity of the spiral flights 14 and the pulp compartments 16 to convey pulp to the solids discharge end 32 of the drum 10.

The amount and temperature of the hot water should be such that the water discharge at the feed end will be between 40° C. and 70° C. The preferred discharge temperature is about 50° C. and is required to ensure that bitumen has softened and separated from the oil sand in the preferred 10 minutes residence time. To achieve this preferred temperature the hot water temperature feed at the pipe 50 that is required will be about 80°–90° C. and the amount of water about 40%–50% of the weight of oil sand feed. If cold or frozen oil sand is being processed more water or higher temperature water may be required.

It should be noted that the amount of hot water required is a function of the process heat requirement, and the requirement to provide adequate free water to allow the bitumen to separate from the sand, rather than a requirement to provide dilution of clay slurry as in the Clark process. Because of the gentle action of the drum 10 the clays contained in the oil sands feed are dispersed only to a very limited degree and the quantity of clay dispersion formed is greatly reduced. Because of the limited dispersion of clay, it will normally be possible to recycle a substantial portion of the water utilized, thus substantially reducing the water and thermal requirements of the process, possibly by as much as 50% compared to conventional techniques based on the Clark process.

Test results from a small pilot plant operating at the preferred conditions suggest that the weight percentage of the bitumen in the oil sand feed which is recovered is expected to be greater than 80%. Over 85% of the mineral solids in the feed are expected to be recovered at the solids discharge, and the material recovered is expected to be more than 75% solids. Considerable variations may occur according to the characteristics of the feed and conditions of operation, but an oil recovery in the 65–90% range may be realistically expected.

The bitumen 'froth' can flow or be pumped to conventional separation vessels or flotation machinery. The small amount of clay fines in the water can be separated by flocculation and thickening for disposal, and should be more amenable to treatment as alkali has not been used in the processing.

The damp sand, clay lumps, and rocks discharged at the solids discharge can be conveyed on belt conveyors or trucked immediately back into the mine or for permanent disposal. Some pile draining may be required for final water removal from the solids discharge.

Variations to the apparatus or process of the invention may be made within the scope of the appended claims.

I claim:

1. A method of releasing and separating bitumen from oil sands containing clay, comprising the steps of submerging oil sands to be treated into a bath of hot water, gently rolling the oil sands within the bath to form a pulp beneath a continuous water layer, resultant agitation of the water and pulp being insufficient to prevent liberated oil droplets from migrating to the surface of the bath, and the rolling of the pulp being insufficiently aggressive to cause substantial dispersion of clay present in the oil sands, but sufficient to provide prolonged contact with the hot water to ensure substantial release and separation of bitumen coating granules of the oil sands, removing solid constituents of the oil sands from one end of the bath, and removing water and oil from the other end of the bath, oil sands and hot water being supplied at opposite ends of the bath to those at which they are removed.

2. A method according to claim 1, wherein the bath is located in a cylindrical drum and the pulp is rolled therethrough by a spiral flight and mixer elements within the drum.

3. A method according to claim 1, including the step of allowing the water and oil to reside in a settlement zone prior to removal.

\* \* \* \* \*